A. HUNTER.
Car-Axles.
No. 148,705. Patented March 17, 1874.
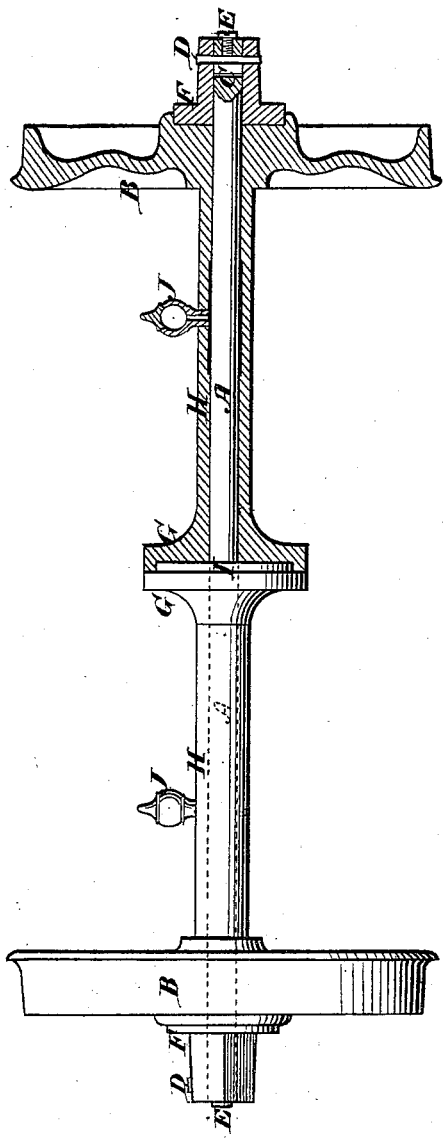

UNITED STATES PATENT OFFICE.

ANDREW HUNTER, OF QUINCY, ILLINOIS.

IMPROVEMENT IN CAR-AXLES.

Specification forming part of Letters Patent No. 148,705, dated March 17, 1874; application filed December 9, 1873.

*To all whom it may concern:*

Be it known that I, ANDREW HUNTER, of Quincy, in the county of Adams and State of Illinois, have invented certain Improvements in Railroad Wheels and Axles, of which the following is a specification:

My invention relates to improvements in car-axles; and consists in the employment of two sleeves fitting loosely over the car-axle, to which the wheels are attached, so that each wheel can move independently of the other in combination with collars fitting over the axle and working in oblong slots therein, as hereinafter more fully set forth.

In the accompanying drawings, A is the car-axle, and H H are two sleeves or hollow cylinders fitting over the axle, to which the wheels B B are attached, thus allowing the wheels to turn on the car-axle independently of each other, so that in turning a curve the inner wheel may revolve slowly, thus avoiding in a great degree the friction of the inner wheel on the rail. The inner ends of the sleeves H H are terminated by disks or collars G G, one of which has a projection which fits into a corresponding recess in the other. I is a washer, situated between the collars G G. The wheels B B are made in the ordinary manner, excepting that a recess is cast in the outer side of each for the reception of flanged collars F F, situated on the ends of the axle, the flanges on the collars fitting into the recesses in the wheels. C is an oblong slot made in the end of the axle, a key, D, being inserted in a perforation in the collar, and passing through the oblong slot C in the axle. E E are screws, inserted into screw-threaded tubular recesses in the ends of the axle, and having their inner ends bearing against the keys D D. J are oil-cups fastened to the sleeves H H.

I am aware that a divided tubular axle having the car-wheels fixed thereto, and a solid undivided center-piece or mandrel, whereby the two parts of the said tubular axle are secured together so as to rotate independently of each other, have heretofore been employed; and I, therefore, lay no claim to such invention.

I claim as my invention—

The car-axle A, provided with oblong slots C C, in combination with the sleeves H H attached to the car-wheels B B, flanged collars F F, and keys D D, substantially as described, and for the purpose set forth.

In testimony whereof I have hereunto set my hand this 19th day of November, A. D. 1873.

ANDREW HUNTER.

Witnesses:
 J. C. BERNARD,
 E. H. OSBORN.